(12) United States Patent  (10) Patent No.: US 8,048,244 B2
Hain  (45) Date of Patent: Nov. 1, 2011

(54) SYSTEM AND METHOD OF FORMING AN ARTICLE, AND AN ARTICLE FORMED THEREBY

(75) Inventor: Scott Hain, Orchard Park, NY (US)

(73) Assignee: SDH, Inc., Orchard Park, NY (US)

( * ) Notice: Subject to any disclaimer, the term of this patent is extended or adjusted under 35 U.S.C. 154(b) by 12 days.

(21) Appl. No.: 12/004,560

(22) Filed: Dec. 21, 2007

(65) Prior Publication Data

US 2009/0162603 A1   Jun. 25, 2009

(51) Int. Cl.
    B32B 5/08   (2006.01)
    B32B 5/26   (2006.01)
    B32B 37/06  (2006.01)

(52) U.S. Cl. .......................... 156/62.2; 156/62.4; 156/245

(58) Field of Classification Search .................. 156/62.2, 156/62.4, 245; 264/115, 121, 126; 425/80.1, 425/82.1
    See application file for complete search history.

(56) References Cited

U.S. PATENT DOCUMENTS

| | | | |
|---|---|---|---|
| 3,325,349 A | 6/1967 | Reifers | |
| 3,859,823 A * | 1/1975 | Ellis | 66/9 B |
| 5,079,074 A | 1/1992 | Steagall et al. | |
| 5,093,946 A | 3/1992 | Difloe | |
| 5,141,805 A | 8/1992 | Nohara et al. | |
| 5,482,665 A | 1/1996 | Gill | |
| 5,489,351 A * | 2/1996 | Yoshida et al. | 156/62.6 |
| 5,492,662 A | 2/1996 | Kargol et al. | |
| 5,494,627 A | 2/1996 | Kargol et al. | |
| 6,033,501 A | 3/2000 | Yamaguchi et al. | |
| 6,210,147 B1 * | 4/2001 | Mori et al. | 425/384 |
| 7,040,706 B2 | 5/2006 | Koffler | |
| 2004/0195717 A1 * | 10/2004 | Kataoka et al. | 264/102 |

FOREIGN PATENT DOCUMENTS

| | | |
|---|---|---|
| JP | 7-324266 | 12/1995 |
| WO | WO 91/18828 | 12/1991 |

\* cited by examiner

*Primary Examiner* — Michael Tolin
(74) *Attorney, Agent, or Firm* — The Watson I.P. Group, PLC; Jovan N. Jovanovic; Vladan M. Vasiljevic

(57) ABSTRACT

A method of forming an article from a plurality of fiber bundles comprising the steps of providing at least one supply of fiber bundles, the fiber bundles having bonding fibers, supplying the fiber bundles to an injector, sequentially injecting fiber bundles from the fiber bundle feed assembly to predetermined positions within a mold member, heating the fiber bundles within the mold member to facilitate the adhesion of bonding fibers to, in turn, integrate the fiber bundle into an article, and, removing the fiber bundles from the mold member. An article and a system for forming same is likewise disclosed.

16 Claims, 15 Drawing Sheets

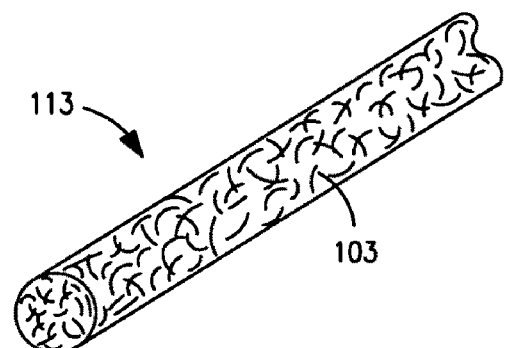
FIG. 8
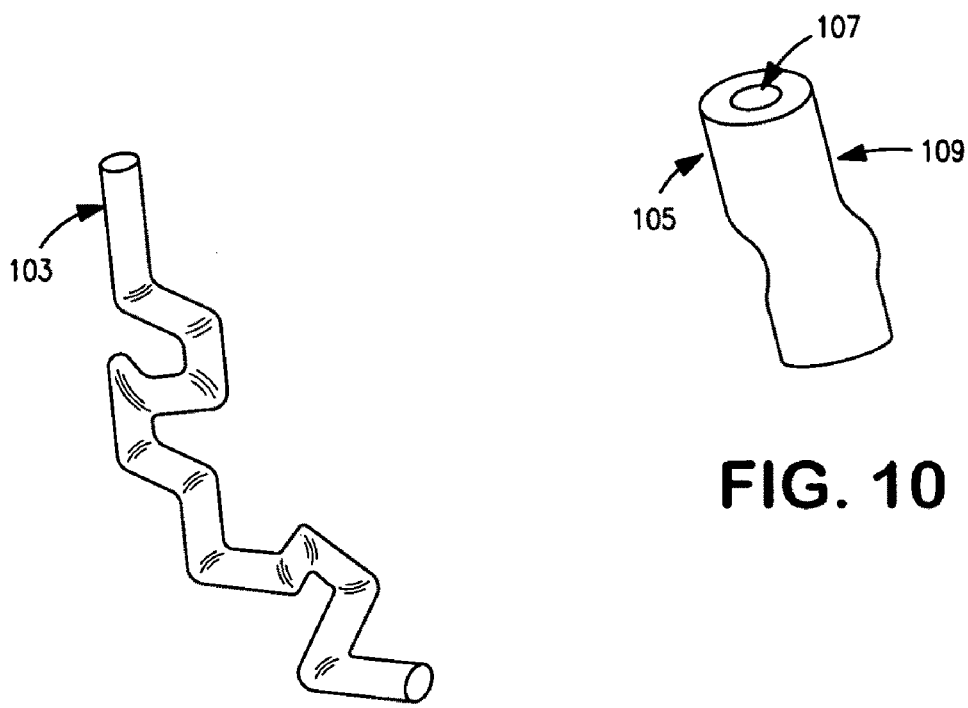
FIG. 10
FIG. 9a
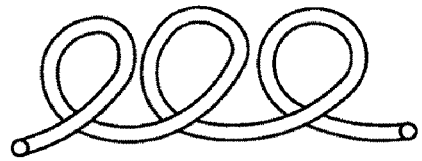
FIG. 9b

SYSTEM AND METHOD OF FORMING AN ARTICLE, AND AN ARTICLE FORMED THEREBY

BACKGROUND OF THE DISCLOSURE

1. Field of the Disclosure

The disclosure relates in general to the formation of articles and the articles formed thereby, and more particularly, to an article forming method and system comprising the injection and heating of a plurality of fiber bundles to form an integrated article (which in certain embodiments may include an integrated cover and/or an integrated frame member). Among other articles, as seat cushion article is disclosed as well as a method and system of formation thereof. It will be understood that the seat cushion provides an exemplary embodiment, and is not intended to be limiting in any manner.

2. Background Art

Articles, such as cushions and other resilient, yet elastically deformable components, are formed from many different materials in a number of different manners. For example, horse hair cushions were for a long time made from a plurality of natural fibers which were bonded together with a bonding agent, such as a latex material. The combination is then covered with a fabric or other textile. Over time, the fibers degrade as does the bonding agent. Moreover, such a cushion is susceptible to compression set over time and repeated use.

Other cushions are formed from a foam material. In certain embodiments, a urethane closed cell foam is utilized. It is cut so a desired shape and often covered with a fabric or other textile. In other embodiments, the urethane foam can be molded into a desired shape. Again, a fabric or other textile covers the molded foam. While these foams have advantages over the horse hair cushion described above, there are problems associated with the urethane foam.

For example, the urethane foam is typically substantially uniform throughout. Thus, the resulting cushion is substantially uniform. If it is desired to have different regions having different performance, pieces of foam are typically cut into multiple smaller parts and glued together to form different regions. This is a labor intensive operation and is typically not feasible from a cost standpoint. Additionally, the adhesives and joints between the different foam pieces can suffer performance degradation.

Furthermore, the urethane foam captures and retains fluids. Often, the retention of fluids results in odor problems and moisture problems. It is often difficult to fully dry urethane foam. Thus, mold and mildew can quickly set into the urethane foam.

Finally, as urethane foams are formed from a chemical reaction of two reagents, the recyclability of such urethane foams is quite limited. Typically, urethane foams can be shredded to form carpet padding and the like. However, it is not possible to remold or reform urethane foam into a new cushion structure. Thus, reuse and recyclability of urethane foam cushions is quite limited.

SUMMARY OF THE DISCLOSURE

The disclosure, in a first aspect, is directed to a method of forming an article from a plurality of fiber bundles comprising the steps of providing at least one supply of fiber bundles, the fiber bundles having bonding fibers; supplying the fiber bundles to an injector; sequentially injecting fiber bundles from the fiber bundle feed assembly to predetermined positions within a mold member; heating the fiber bundles within the mold member to facilitate the adhesion of bonding fibers to, in turn, integrate the fiber bundle into an article; and removing the fiber bundles from the mold member.

In a preferred embodiment, the step of providing a supply of fiber bundles comprises the steps of providing a fiber tow comprising a bonding fiber and at least one other fiber; and separating the fiber tow into fiber bundles.

In another preferred embodiment, the step of providing a fiber tow further comprises the steps of: providing at least a bonding fiber and at least one other fiber in a predetermined ratio; mixing the provided fibers together; and forming a fiber tow.

In another preferred embodiment, the at least one other fiber further comprises at least one of a performance fiber, a feel fiber and a recycled fiber.

In yet another preferred embodiment, the at least one fiber further comprises at least two other fibers provided in predetermined ratios.

In a preferred embodiment, the supply of at least one supply of fiber bundles further comprises the supply of at least one other fiber bundle. Additionally, the step of supplying further comprises the steps of selecting at least a first one of the fiber bundles for supply to the injector; and transitioning to at least a second fiber bundle for supply to the injector, to, in turn, cause the injector to inject the at least one other fiber bundle into the mold member, or a combination of the first and second fiber bundles simultaneously.

In yet another preferred embodiment, the mold member comprises a permeable member. In one such an embodiment, the step of heating further comprising the step of directing an air flow at an elevated temperature through the mold member for a period of time. In another such embodiment, the step of heating further comprises the step of directing a flow of superheated steam at an elevated temperature and pressure through the mold member for a period of time.

In another preferred embodiment, the step of directing an air flow further comprises the steps of placing the mold member within an oven and recirculating an air flow through the mold member for a period of time.

In one such preferred embodiment, a cover member can be inserted into the mold member prior to, during or after the step of sequential injection of the fiber bundles within the mold member. An adhesive can be applied to an inside surface of the cover member prior to, or after the step of insertion.

In another embodiment, one of a silkscreen or a graphic can be supplied within the mold member prior to, during, or after the step of sequential injection of ht efiber bundles within the mold member.

In another embodiment, a frame member can be inserted into the mold member prior to or during the step of sequential injection of the fiber bundles within the mold member. In one such embodiment, an adhesive can be applied to the frame member.

Preferably, the method further comprises the step of cooling the integrated fiber bundle after the step of heating.

In one particular embodiment, the method further comprises the step of conditioning the integrated fiber bundle during the step of cooling.

In another aspect, the disclosure provides for a system for forming an article. The system comprises a fiber bundle supply assembly, a mold member, an injector and a heating assembly. The fiber bundle supply assembly sequentially provides fiber bundles of at least one type at an output. The injector is in fluid communication with the output of the fiber bundle supply assembly. The injector includes a positioning assembly facilitating traversing of the mold member thereacross. The injector can then inject fiber bundles in virtually any region of the mold member, and in a desired orientation within the mold member. The heating assembly is configured to receive the mold member upon injection of fiber bundles by the injector. The heating assembly elevates the temperature of the fiber bundles to a predetermined temperature for a period of time.

In one embodiment, the fiber bundle supply assembly sequentially or simultaneously provides fiber bundles of at least two different types at the output, so as to transition therebetween, as desired.

In another embodiment, the positioning assembly comprises a robotic arm having a plurality of degrees of freedom.

In yet another embodiment, the mold member comprises an air permeable member. The heating assembly including an air directing unit which directs air at an elevated temperature through the mold member. In another embodiment, a superheated steam at an elevated temperature and pressure is directed through the mold member.

In another embodiment, the system includes a cooling assembly. The cooling assembly cools the mold member and the fibers positioned therein after placement in the heating assembly.

In another embodiment, at least one of the mold member and the cooling assembly further includes means for conditioning the fibers within the mold member during cooling.

In another aspect, the disclosure provides for an article. The article comprises a plurality of fibers of at least two different types. The fiber types are positioned in a desired orientation by an injector. The plurality of fibers are linked together through a series of bonds effectuated by melted portions of bonding fibers present in each of the fiber types. The interconnected fibers form an elastically deformable cushion member.

In a preferred embodiment, the article includes regions which are defined by a different fiber type composition.

In another preferred embodiment, the at least two different types of fibers comprise three different fiber types. The article comprises a seat cushion. The seat cushion has a first region predominantly having a first fiber type proximate a buttocks region of the cushion, a second region predominantly having a second fiber type proximate a leg-knee region, and a third region predominantly having a third fiber type proximate a region surrounding the leg-knee region and the buttocks region.

Preferably, the fibers are conditioned at an elevated temperature.

In a preferred embodiment, an integrated frame member can be at least partially embedded within the fibers.

In another embodiment, an integrated cover member extends about at least a portion of the outside of the article. Additionally, a silkscreen or graphic can extend about at least a portion of the outside of the article.

BRIEF DESCRIPTION OF THE DRAWINGS

The disclosure will now be described with reference to the drawings wherein:

FIG. 8 of the drawings comprises a perspective view of a fiber tow of the system of the present disclosure;

FIGS. 9a and 9b of the drawings comprises a side view of a sample fiber utilized in association with the system of the present disclosure, wherein FIG. 9a comprises a fiber that includes crimps and FIG. 9b comprises a fiber that includes spirals;

FIG. 10 of the drawings comprises a partial perspective view of a sample fiber, showing, in particular, a central core member and an outer cladding member which surrounds the central core member, the cladding member and the central core member having different melting points, such that the cladding melts at a temperature lower than the cladding;

DETAILED DESCRIPTION OF THE DISCLOSURE

Figure 1:
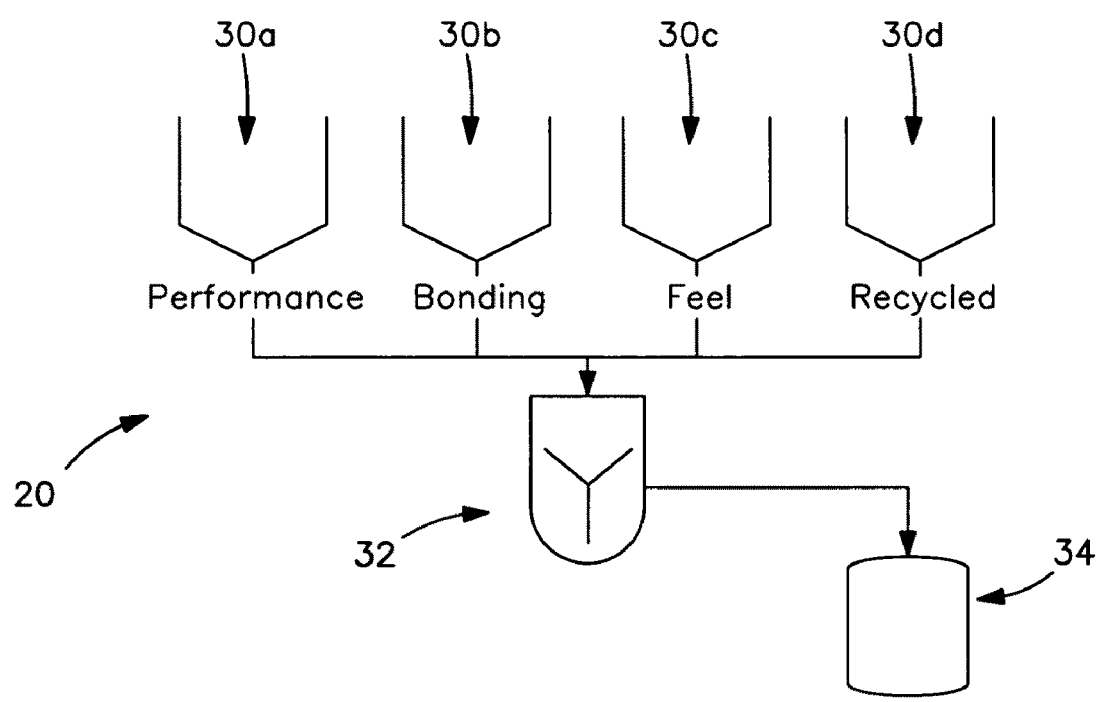
FIG. 1 of the drawings comprises a schematic view of the material preparation assembly of the system of the present disclosure.

While this invention is susceptible of embodiment in many different forms, there is shown in the drawings and described herein in detail a specific embodiment with the understanding that the present disclosure is to be considered as an exemplification and is not intended to be limited to the embodiment illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIGS. 1 through 4, the article forming system is shown. The article forming assembly is configured to form an article from a plurality of individual polymer fibers which have been mechanically bonded to each other, through the melting and re-solidification of bonding fibers. In an exemplary embodiment shown in FIG. 13, a seat cushion 131 is disclosed. It will be understood that the invention is not limited to use in association with a seat cushion, seating or any other particular article to be formed.

Figure 4A:
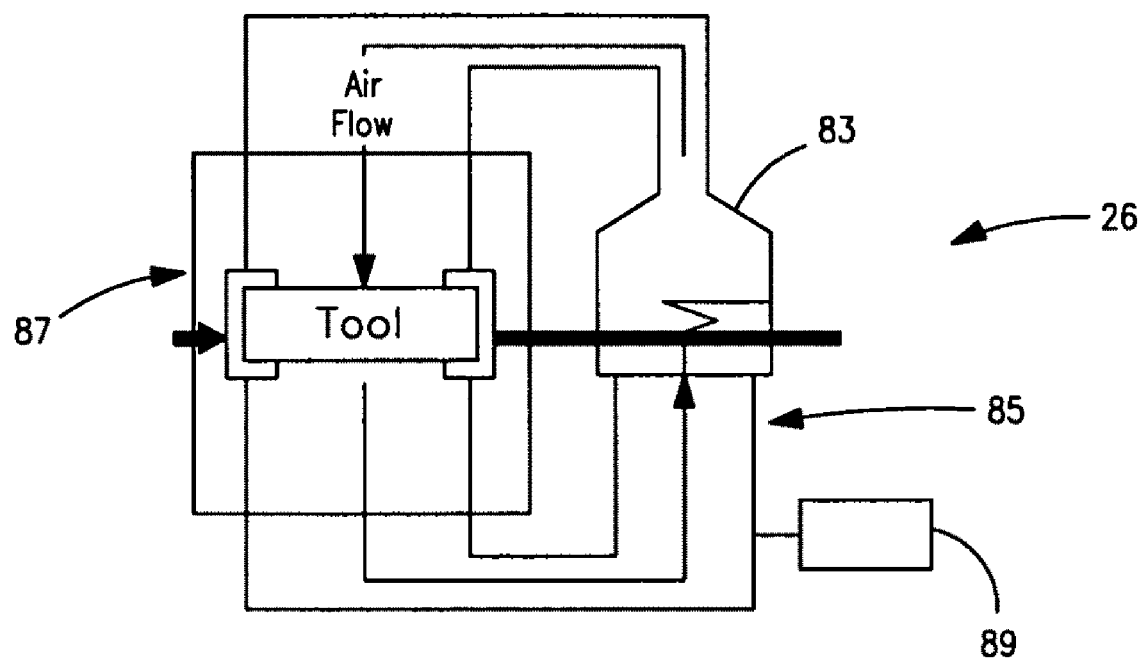
FIG. 4a of the drawings comprises a schematic view of the heating assembly of the system of the present disclosure.
Figure 4B:
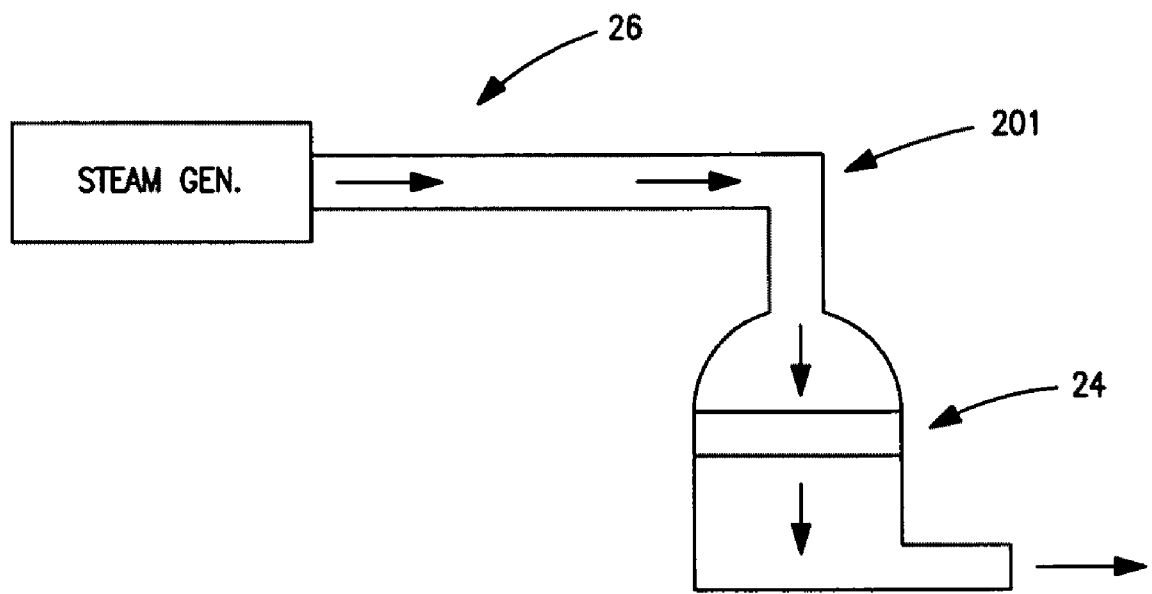
FIG. 4b of the drawings comprises a schematic view of a second embodiment of the heating assembly of the system of the present disclosure.
Figure 5:
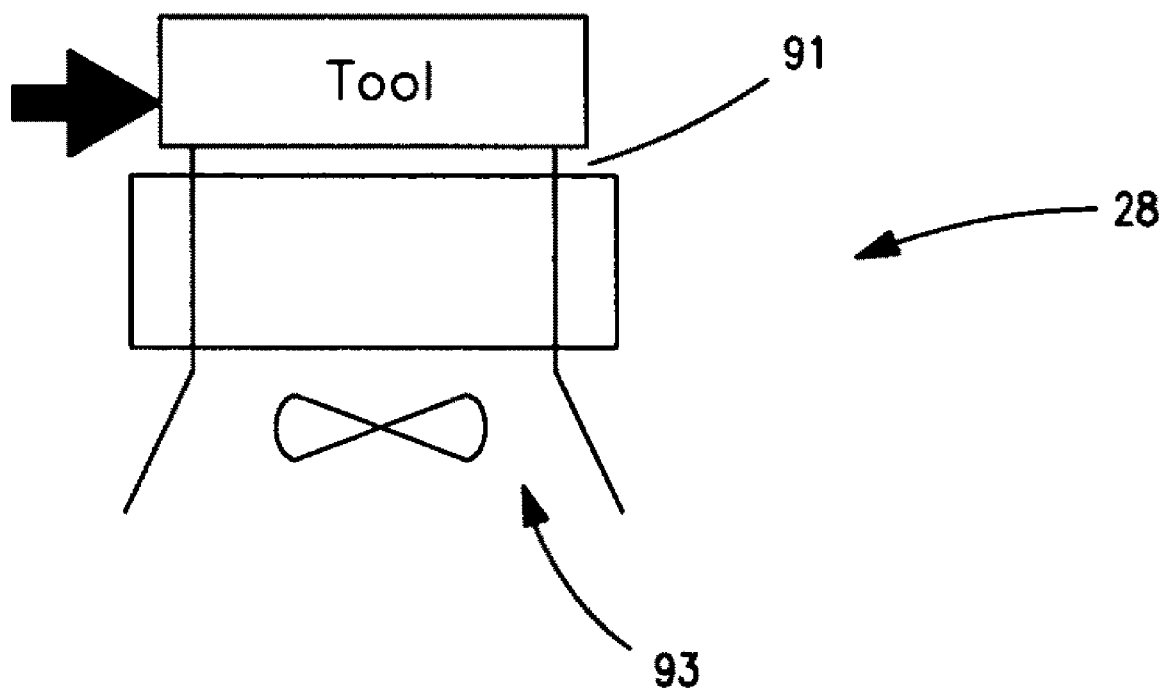
FIG. 5 of the drawings comprises a schematic view of the cooling assembly of the system of the present disclosure.

The article forming assembly comprises material preparation assembly 20 (FIG. 1), article formation assembly 22 (FIG. 2), mold member 24 (FIG. 6), heating assembly 26 (FIG. 4) and cooling assembly 28 (FIG. 5). The material preparation assembly 20 is shown in FIG. 1 as comprising material supply stations 30a through 30d, material mixing station 32 and material storage 34.

Material supply station 30a through 30d each include polyester fibers of a particular type or blend types. For illustrative purposes, not to be considered limiting, the embodiment illustrated includes four different material supply stations, each of which includes one of the following polyester fiber types, performance, bonding, feel and recycled. Of course, a number of different fiber types are contemplated for use, and the foregoing fiber types comprise but a sampling of the different fiber types that could be utilized. Additionally, it is contemplated that a system may utilize a plurality of different fiber types, in excess of the four types illustrated in the present embodiment. In other embodiments, fewer than four different fiber types can be utilized.

Generally, and with reference to FIG. 9, the fiber 103 comprise predetermined lengths of material having a typical length of approximately 5 mm to 100 mm, more preferably between 10 mm and 75 mm and most preferably between 40 mm and 60 mm. With particular reference to FIG. 9a, certain of the fibers are crimped so as to have arbitrary and generally non-uniform shapes. It is these kinks and bends that facilitate the releasable attachment and commingling of other adjacent fibers. While a number of different fibers are contemplated, and for exemplary purposes only, the typical fibers may include anywhere between 7 and 12 crimps per inch. In other embodiments, such as the embodiment shown in FIG. 9b, the fibers may comprise a tangle spring structure, which comprises a curled spring-like configuration.

The fibers may comprise a substantially uniform cross-sectional configuration wherein the polymer material is substantially homogenous throughout. In other embodiments, such as the embodiment shown in FIG. 10, the fiber 105 may comprise a plurality of different materials. The fiber 105 may comprise a core material 107 which is surrounded by a second, cladding layer 109 that surrounds the core. The cladding layer, in such an embodiment, has different characteristics than the core layer, such as, for example, a different melting point and a different chemistry. Many bonding fibers have such a configuration.

Among other materials, the fibers comprise polymer fibers such as polyester fibers as well as thermoplastic coated polyester fibers. Other materials, such as, for example polyester elastomer coated polyester fibers are contemplated, as are fibers which are formed from any one PET, PCT, PBT, PETG, polypropylene, nylon, PLA (polylacteacide) and PPS. Of course, the foregoing is considered exemplary and is not intended to limit the invention to the identified fiber types.

An exemplary performance fiber may be a polyester fiber sold by Invista under the model number Invista 3295. An exemplary bonding fiber may K150 or K10 available from EMS. Exemplary bi-component fibers which include an outer cladding that is configured for bonding purposes include F-58 fiber available from Fiber Innovative Technologies (FIT), Tairilin low melt available from Stein and/or ELK available from Tejin. An exemplary feel fiber may comprise Style 121-01564 15 denier hollow conjugated fiber available from Stein. Recycled fibers may comprise any combination of previously bonded fibers, including bonding fibers (which have already been melted at least once before, along with various combinations of feel and performance fibers. Of course, the foregoing fibers are deemed exemplary and are not intended to limit the invention to the identified particular fibers identified herein.

At predetermined quantities and feed rates, the fibers can be fed from the material supply stations 30a through 30d into the material mixing station 32. Typically, the material mixing station comprises a mill that pulls the fibers into a chamber and mixes the different fibers coming from the supply stations into a substantially homogenous mixture of different fibers. As set forth above, the quantities of each type of fibers can be varied, as can the fibers that are utilized to form a particular fiber blend. Typically, the blends include some bonding fibers, such as between 8% and 24% bonding fibers. More specifically, bonding fibers of the type shown in FIG. 9 are typically between 8% and 12% of a corresponding blend, whereas bonding fibers of the type shown in FIG. 10 are typically between 15% and 24% of a corresponding blend.

As an output, the fibers are formed into an elongated fiber tow which is then wound about itself or another object in the material storage 34. An exemplary fiber tow 113 is shown in FIG. 8. While variations are contemplated, the fiber tow generally has a cross sectional configuration which is substantially circular with a diameter of approximately 1 to 3 centimeters. The fibers of the fiber tow are held together loosely by the natural commingling of the various crimps and spirals of the individual fibers 103. It will be understood that the fiber tow may comprise a single fiber type, or a particular blend of two or more of the different fiber types supplied by the material supply stations 30a through 30d. It will be understood that the flow from the different material supply stations can be varied such that virtually an infinite combination of fibers and rations can be obtained.

Figure 15:
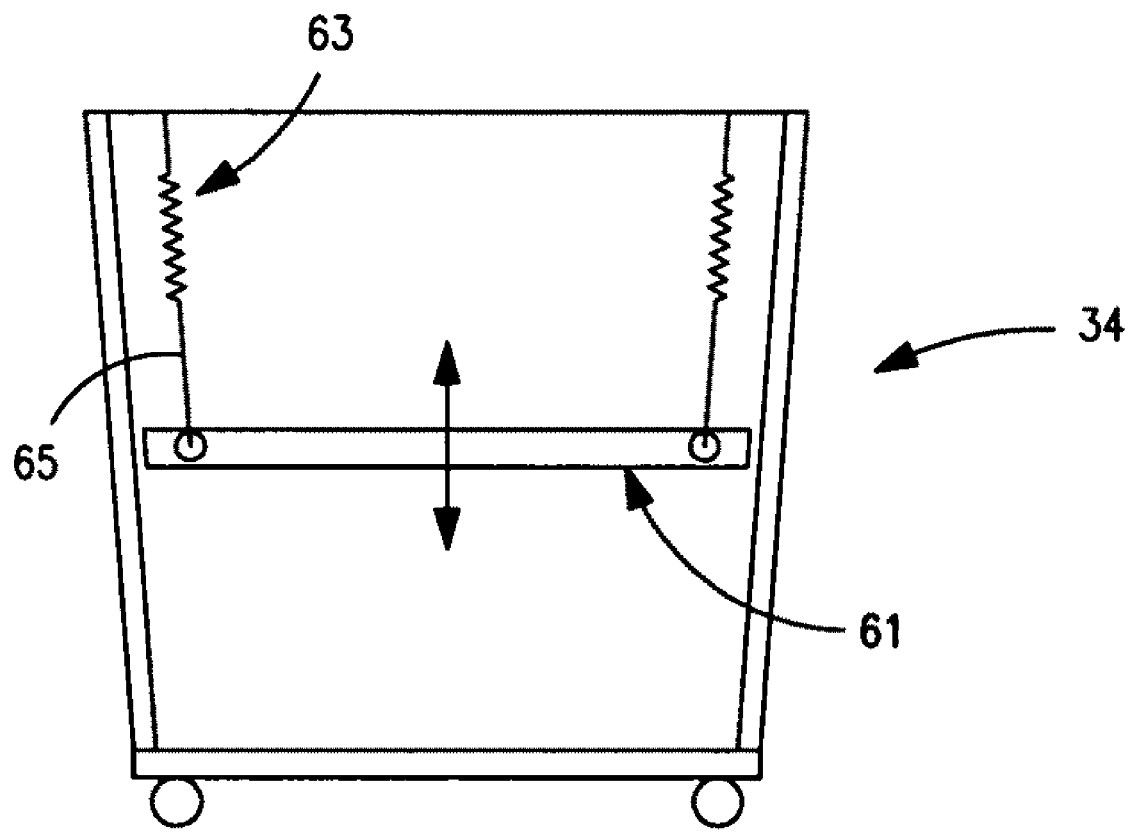
FIG. 15 of the drawings comprises a cross-sectional view of an exemplary storage container for storing fiber tows of the present invention.

In one embodiment, the fiber tow is placed into a storage container 34 wherein the cavity is of varying volume, based on the weight of the contents. For example, as is shown in FIG. 15, the storage container 34 may include a base 61 that is mounted on a biasing assembly 63. The biasing assembly (which may comprise a plurality of springs 65) is slowly overcome by the force exerted by the weight of the fiber tow placed thereon. Additionally, the fiber tow can be controlled as it is placed into the storage container to minimize the disruption of the fiber tow during removal. Of course, other storage containers are contemplated for use, including storage containers of fixed volume or storage containers which comprise spools or other structures wherein the fiber tow surrounds the structure, and the structure is not particularly inclusive of a cavity or chamber. In other embodiments, the tows can proceed directly from their production to the article formation assembly 22.

Figure 2:
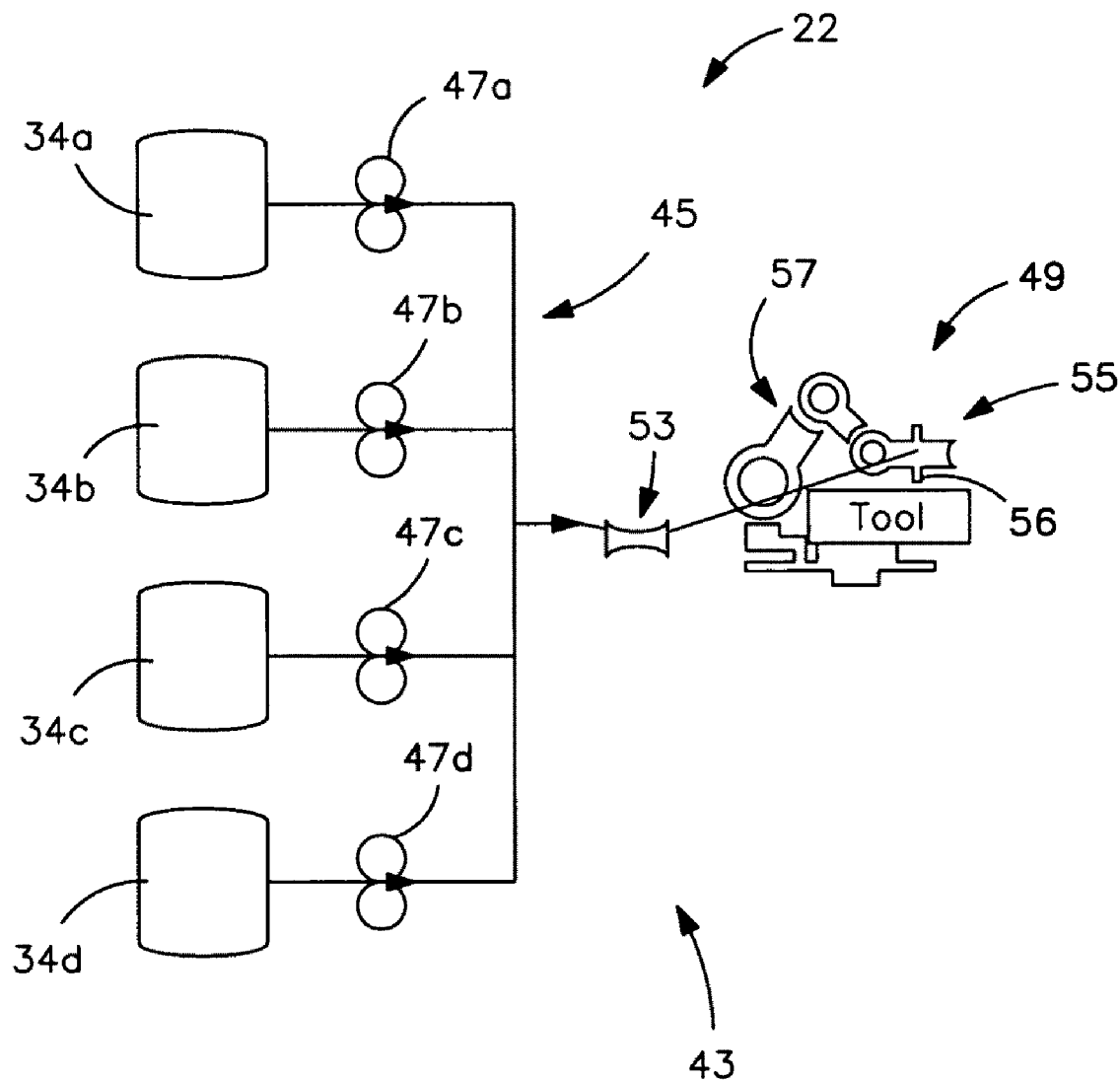
FIG. 2 of the drawings comprises a schematic view of the article formation assembly of the system of the present disclosure.

Referring now to FIG. 2, the article formation assembly 22 comprises a material feed assembly 43 that feeds material from storage containers, such as storage containers 34a-34d (or directly from the material mixing station 32). The material feed assembly 43 includes an indexing drive assembly 35 having a plurality of indexing drive members 47*a* through 47*d*, one for each type of fiber tow that may be utilized for a particular application, and an injector assembly 49. The indexing drive assembly is configured to remove, at a predetermined speed and rate a particular fiber tow from a storage container. It is contemplated that the storage container identified above relative to the material preparation assembly can be utilized. This is especially useful inasmuch as it limits the handling and movement of the relatively delicate fiber tows.

With continued reference to FIG. 2, an indexing drive assembly is provided and associated with each of the fiber tows that are to be utilized to form a particular article. The indexing drive assembly comprises a grasping member which is capable of supplying a particular quantity of the fiber tow at a particular rate to the feed system. In one embodiment, the indexing drive assembly comprises a plurality of rotating wheels each of which grasp portions of the outer surface of the fiber tow and pull the fiber tow from the storage container. Of course, other systems that manipulate the fiber tow are contemplated, such as, for example, conveyors or finger-like grabbing jaws.

In certain embodiments, a single indexing drive assembly will provide a fiber tow to the feed system at a particular time. The indexing drive assemblies can operate sequentially in any order for any duration of time, such that at any given time, any one of the fiber tows can be feed to the injector assembly. The indexing drive assembly can easily be switched on or off such that the system can switch between different indexing drive assemblies to transition between the fiber tows.

In another embodiment, multiple indexing drives can be provided that can operate simultaneously at speeds that are independent of each other. In such an embodiment, a first fiber tow can be supplied at a first rate, while a second fiber tow can be supplied at a second rate. The rates can be adjusted with respect to time, such that a smooth transition can be achieved between the two fiber tows. For example, initially, the first fiber tow can be fed at a rate that is substantially higher than the second fiber tow. Over a predetermined period of time, the rate of the second fiber tow can be increased while decreasing the rate of the first fiber tow until the second fiber tow comprise a rate which is substantially higher than the first fiber tow. It will be understood that the same combination of fiber tows can be achieved with in excess of two fiber tows, such, as for example, four or more fiber tows. Thus, one can transition from any combination of fiber tows to any other combination of fiber tows.

Figure 3:
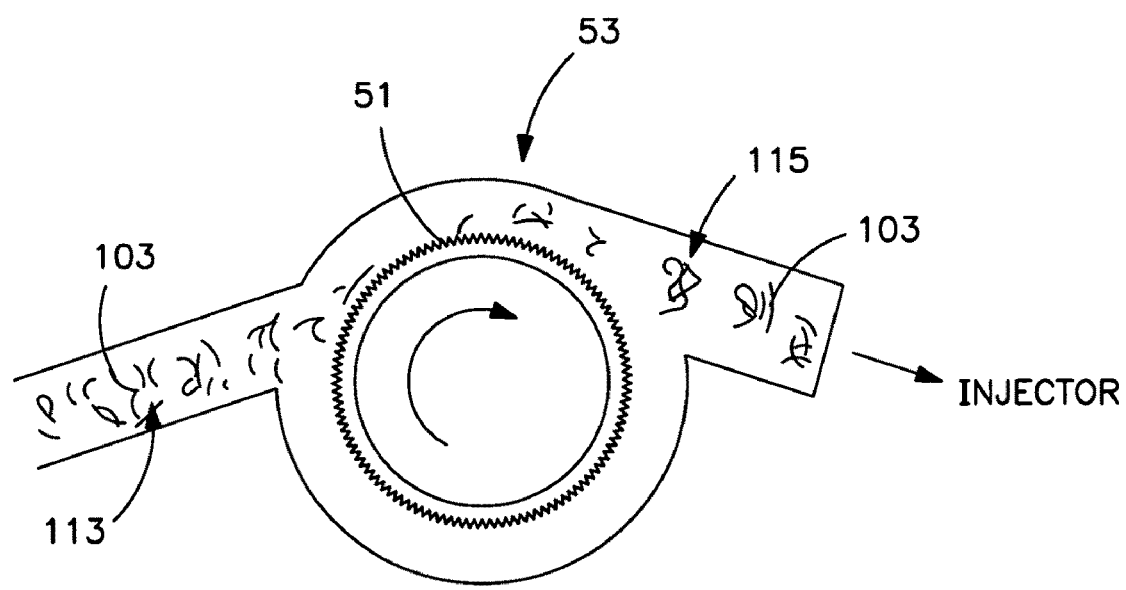
FIG. 3 of the drawings comprises a partial schematic view of an embodiment of the feeder member of the system of the present disclosure.

The injector assembly 49 comprises a feeder member 53 and a injector assembly 55. With particular reference to FIG. 3, the feeder member 53 is configured to separate fibers 103 from the fiber tow 113 into an injection sized fiber bundle 115. For example, an injection sized fiber bundle may comprise a one to two centimeter bundle of fibers separated from the end of the fiber tow. The size of the fiber bundle can be varied, and the dimensions above are provided for illustrative purposes. For example, a fiber bundle may comprise as little as a single fiber, or may comprise a group or plurality of fibers such as, two to 400 fibers or more. In the embodiment shown, the feeder member comprises a spinning series of teeth 51 which extend along the outer circumference of the spinning member and which are configured to pull apart a portion of the fiber tow. By controlling the speed of the blades, the size of the fiber bundle can be varied. In other embodiments, the blades can be replaced with a plurality of spikes or pins extending from the spinning member.

With reference to FIG. 2, the injector assembly 55 comprises an injector member 56 mounted to the operational end of a robotic articulating arm 57. The robotic articulating arm can be positioned in any one of a number of positions, wherein the positioning and movement of the robotic articulating arm can be closely controlled, by a computer or controller. For example, as a positioning assembly for the injector, a multi-axis robotic arm can be provided. The injector member is mounted on the operational end of the robotic arm and is placed in fluid communication with the output of the feeder member. As such, the injector can direct and place the injection sized fiber bundle pneumatically in a particular location within the range of movement of the robotic articulating arm. It will be understood that air or another fluid may be directed at the injected fibers in an effort to keep them against the mold and to preclude inadvertent movement of the fibers as additional fibers are injected.

Figure 6:
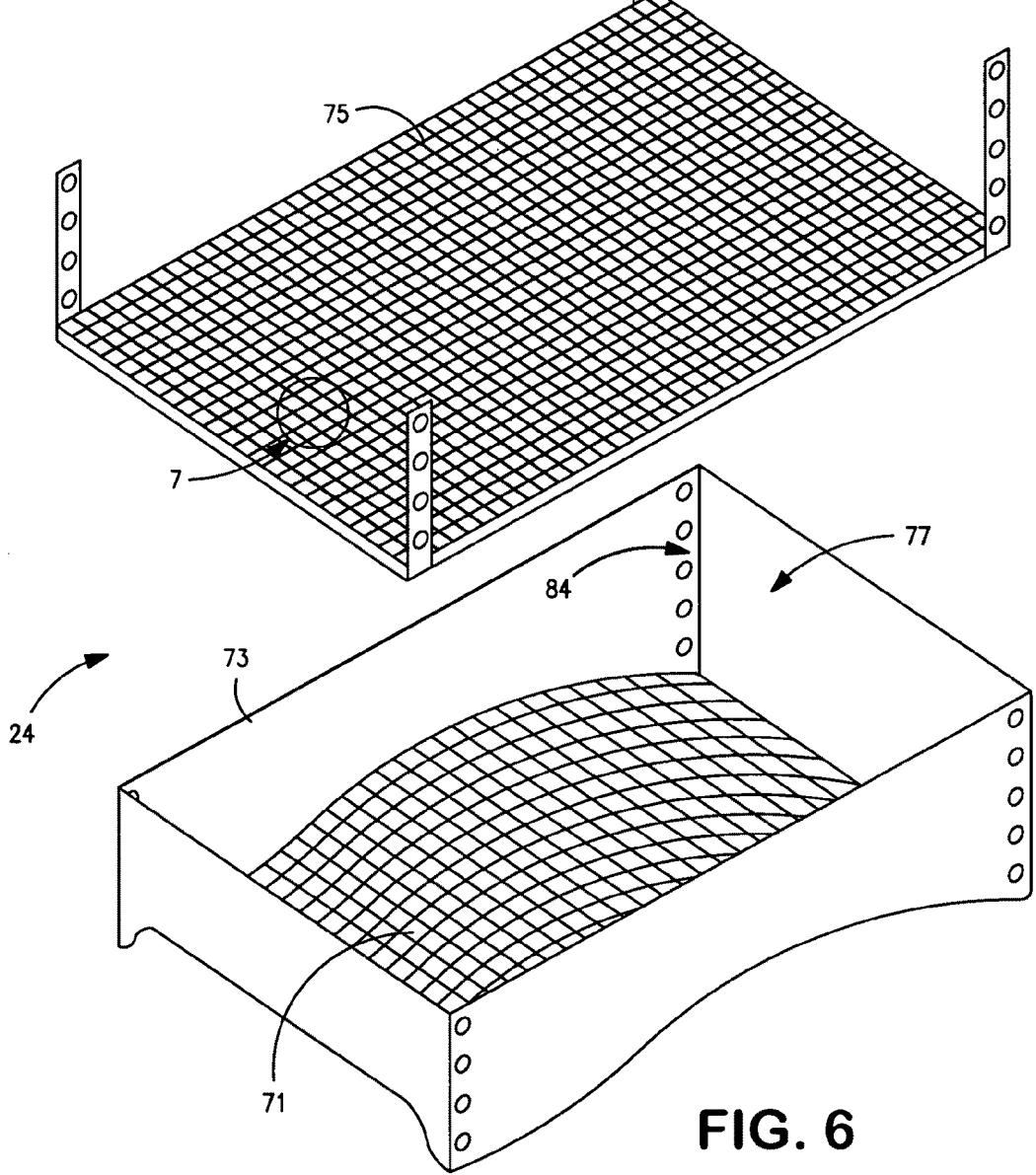
FIG. 6 of the drawings comprises an exploded perspective view of an embodiment of the mold member of the present disclosure.

Referring now to FIG. 6, the mold member 24 comprises a tool mold which is configured to receive the fiber bundles from the injector. In the embodiment shown, a seat bottom is to be formed. As such the mold includes a bottom surface 71, side surfaces 73 and a top surface 75. The bottom surface and side surfaces are separable from the top surface such that access to the cavity defined by these surfaces is provided.

Figure 7:
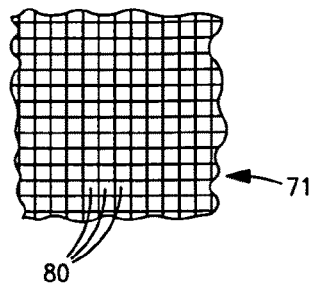
FIG. 7 of the drawings comprises a partial top plan view of the bottom surface of the mold member, showing, in particular, the air permeable surface thereof.

A portion of the bottom surface is shown in FIG. 7. In particular, the bottom surface 71 includes a plurality of openings 80, much like a grate, such that the bottom surface is permeable to air. Typically, the openings are sized such that while air can permeate through the bottom surface, the openings are generally too small to permit the egress of fibers. Of course, inasmuch as certain dimensions of the fibers are quite small, a few fibers may permeate the grate, whereas the predominant portion of the fibers are precluded from permeation. As is shown in FIG. 6, the top surface of the mold is likewise permeable to air, but substantially impermeable to the fibers that make up the fiber bundles and fiber tow.

When the mold member is assembled, the bottom surface 71, side surfaces 73 and top surface 75 define cavity 77 that corresponds to the article that is to be formed. In particular, the top surface can be placed over the bottom surface and attached to the side surfaces. A number of different corresponding attachment fastening structures 82, 84 are provided on each of the two components so that the thickness of the article (i.e., the distance between the top surface and the bottom surface) can be varied.

In the seat example, each of the surfaces is contoured so as to form a seat member which has a plurality of non-planar surfaces. The embodiment shown molds a seat cushion. It will be understood that the molds can be varied so as to form a shaped member which is of any desired shape. As explained above, the size of the cavity (i.e., thickness of the resulting article) can be varied by altering the space between the top surface 75 and the bottom surface 71 of the mold member 24. Indeed, a number of fastening structures 82, 84 are provided so as to vary the attachment position of the top surface relative to the bottom surface. As will be explained below, the fibers within the mold can be compressed during and after formation by altering the relative position of the top and bottom surfaces of the mold, with the fastening structures providing a means by which to compress the fibers. In other molds, surfaces other than the top or bottom surface can be manipulated so as to alter the volume within the mold.

Referring now to FIGS. 4*a* and 4*b*, the heat assembly 26 is configured so as to direct a heated fluid (such as, for example, air (FIG. 4*a*) or superheated steam (FIG. 4*b*)) through the mold member upon placement of the fiber bundles within the mold member. In one particular embodiment, the heat assembly 26 includes a heat source 83, an air circulating assembly 85 and a mold member retaining assembly 87 which facilitates the retention of the mold member within the fluid circulating system. As such, the mold member can be positioned within the mold member retaining assembly such that heated air can be directed across and through the mold member for a desired amount of time. For example, such a time may comprise one to three minutes at temperatures which are in excess of the melting point of the bonding fibers (typically, between 110° C. and 200° C., for example). The heat assembly can be controlled by a controller 89 to maintain particular air flow rates, temperatures, heating times, among other parameters. Adjustment can be made to the top and bottom surfaces while the mold member is within the heating assembly so that the fibers within the mold can be compressed.

In another embodiment, shown in FIG. 4b, the heat assembly 26 may comprise a source of superheated steam 201 which is generated and delivered across the mold member. The steam is then exhausted or, in another embodiment, recirculated. Superheated steam is typically at a pressure that is typically between 120° C. and 250° C., and, as such is under an elevated pressure. Due to the relatively high pressures and temperatures, the time needed to properly heat the mold member, and, in turn, melt the fibers comprises between 20 and 50 seconds. Of course, the foregoing times and temperatures are not deemed limiting but they are merely provided for exemplary purposes.

Referring now to FIG. 5, the cooling assembly 28 is configured to direct cooled air through the mold member having the fibers therewithin. The cooling assembly includes a mold member retaining assembly 91 and an air blower 93. The air blower can be configured to blow a predetermined quantity of air (at a preset or at a variable temperature) through the mold member at a desired flow rate to cool the fibers within the mold member at a predetermined rate. It will be understood that the cooling assembly can continuously reduce the temperature of the mold member and material therewithin, or the cooling assembly can maintain a certain desired elevated temperature for a predetermined period of time during the cooling process. It will be understood that the blower can be controlled by a controller wherein the control parameters may comprise flow rate, speed, temperature and time, amongst others. It will be understood that adjustments can be made to the mold member so as to compress the fibers within the mold member while the mold member is within the cooling assembly.

The system will be described in use to form a seat bottom cushion. It will be understood that the parameters of the method can be varied for different articles that are to be created. Additionally, the article that is formed is considered exemplary and is not to be deemed as limiting the invention to the particular article that is formed. The exemplary article is merely one example of the different construction techniques and operational considerations that can be achieved with the present article forming equipment described hereinabove.

Initially, the present method that is to be described contemplates the formation of four different fiber types that are blended in a particular manner to render three different fiber tows. Thus, and with reference to FIG. 1, the material preparation assembly includes four different material supply stations 30a through 30d. In the present exemplary embodiment the four fiber types for blending comprise performance fibers, bonding fibers, feel fibers and recycled fibers.

The performance fibers have superior compression set parameters, such that they exhibit superior performance when undergoing repeated cyclical loading. One example of such a fiber is Invista 295 sold by Invista.

Bonding fibers comprise fibers which can be melted (or portions of which can be melted) at temperatures which are generally lower than the glass transition temperatures of other fibers. Thus, these fibers melt at lower temperatures (or portions thereof) than other fibers and become the bonding or linking member that joins different and discrete fibers together. Examples of such fibers include K150 and K170 sold by EMS. As explained above, and with reference to FIG. 10, this type of fiber comprise multi-component fibers having a core 107 made from a first material and a cladding 109 made from a different material. The materials are selected such that the outer cladding melts at a temperature well below the temperature of the core, thereby allowing the outer cladding to bond to other fibers, while maintaining the inner core as a unitary component. An example of such a fiber is F-58 of FIT, Tairilin low melt sold by Stein and ELK sold by Tejin.

Feel fibers generally refer to fibers which exhibit superior comfort and softness to the touch and to pressure. These fibers are generally not of a sufficiently high compression strength to sustain relatively heavy repeated and cyclical loads, but provide enhanced comfort to a user that is sitting on the seat. An example of such a fiber is Style 121-01564 15 denier hollow conjugated fiber sold by Stein.

Recycled fibers generally comprise fibers that have been processed into an article and are in the process of being separated and reused. Problematically, the general makeup and formulation of these types of fibers can vary widely. As such, they are typically suitable as filler when particular performance or feel is not required.

From these types of fibers, combinations are mixed to form a plurality of different fiber tows 113 (FIG. 8) having particular formulas. For example, a performance formula can be derived from the mixing of performance fibers and bonding fibers in a desired ratio. Upon mixing, the fibers are formed into a fiber tow. Similarly, feel fibers and bonding fibers can be combined in a particular combination to form a second feel formula. Still further, recycled fibers can be mixed with bonding fibers at a predetermined ratio to form a low cost recycled fiber tow. It will be understood that the ratios of the different components of the various formulas can be varied as desired. Additionally, while in each example, two different fiber types are combined, in certain embodiments more than two different fiber types can be utilized to form still further formulations.

The different fiber tows that are formed may comprise lengths that can vary from, for example 25 meters to 200 or more meters. Additionally, they may be continuously fed from the material mixing stations 32. Indeed, the lengths of the fiber tows, as well as the cross-sectional configurations of the fiber tows can be varied without departing from the scope of the present disclosure. Manageable sizes and dimensions of the fiber tows comprise substantially circular or elliptical cross-sectional configurations having a diameter of between 1 and 3 centimeters (i.e., cross-sectional areas of approximately less than 10 square centimeters). Of course, they can be larger or smaller cross-sectional configurations as well as different lengths.

The different fiber tow formulations are placed into different material storage containers. These containers are then associated with the article formation assembly and positioned such that the fiber tows can be grasped by the material feed assembly. Specifically, and as explained above with reference to FIG. 15, the size of the storage containers is varied in direct proportion to the weight (i.e., quantity) of fibers within the container. The base of the storage container can vary its position based upon the amount of fiber tow remaining in the storage container. As such, the end of the fiber tow remains proximate the top of the storage container. As the fiber tows are quite fragile and mechanically bonded to each other by the physical bends and kinks in the fibers themselves, they can easily be separate and damaged. Thus, the less movement and handling that is required helps maintain the integrity of the fiber tows. Of course, in other embodiments, the fiber tows can be continuously directed from the material mixing station.

In the embodiment illustrated in FIG. 2, each of the fiber tows of the three different formulations are coupled to the indexing feed assembly, and in particular to an indexing feeder. The indexing feeder is controlled such that it can feed a particular quantity of the fiber tow with which it is associated. The indexing feeders are coupled to the feeder which is then in communication with the injector. A single indexing feeder can be delivering a single fiber tow to the injector in certain embodiments. In other embodiments, a plurality of indexing feeders can be delivering a plurality of fiber tows at different rates to the injector. These indexing feeders can be continuously varied to achieve desired combinations.

Figure 11:
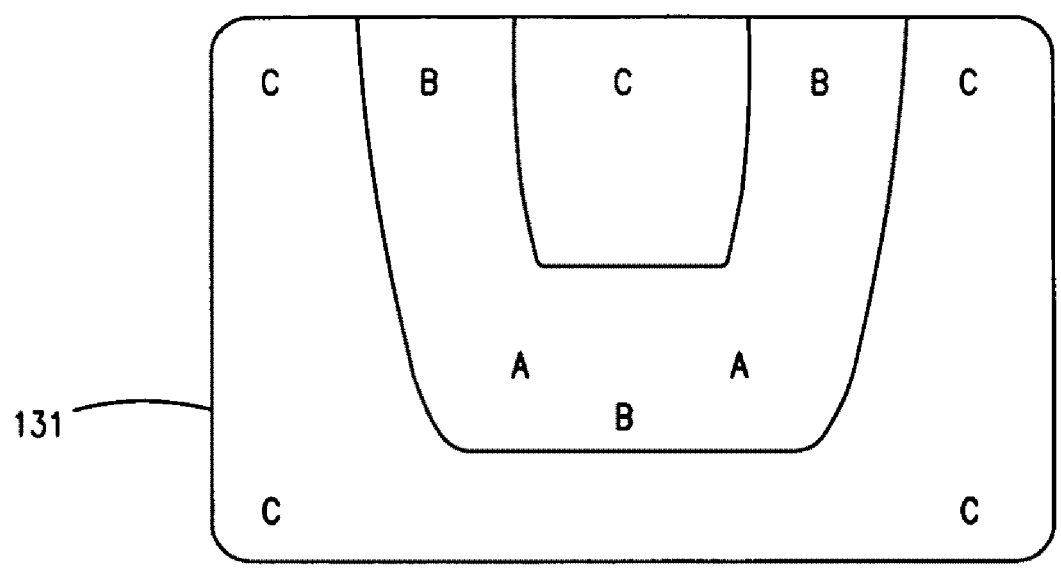
FIG. 11 of the drawings comprises a schematic representation of the various regions of an article which include different fiber compositions, namely composition A, composition B, and composition C.

The illustrated embodiment will form a seat according to the specification shown in FIG. 11. That is, different portions of the seat volume (in each of the x, y and z directions) will include a different combination of fibers which are deposited by the injector. Specifically, performance fiber formulations (A) will be used in areas where support is required (such as where the buttocks of a user will tend to be positioned on the seat). Feel fiber formulations (B) will be utilized where the back of the legs bend over the front of the seat and where certain portions of the buttocks are positioned for maximum comfort. Finally, recycled fiber formulations (C) (which are generally more cost effective) will be utilized in the regions that are not susceptible to large loadings or physical contact over the life of the seat. In the embodiment shown, the formulation is generally uniform in the z direction. It will be understood that the injector can vary in any one of the x, y and z directions.

To achieve such a placement, the system directs the injector to a particular position overlying a portion of the mold. The system then directs the proper fiber to be fed by the respective indexing drive to the feed system. The feed system then forms injector fiber bundles which are fed through the injector and deposited by the injector into the cavity.

Figure 12:
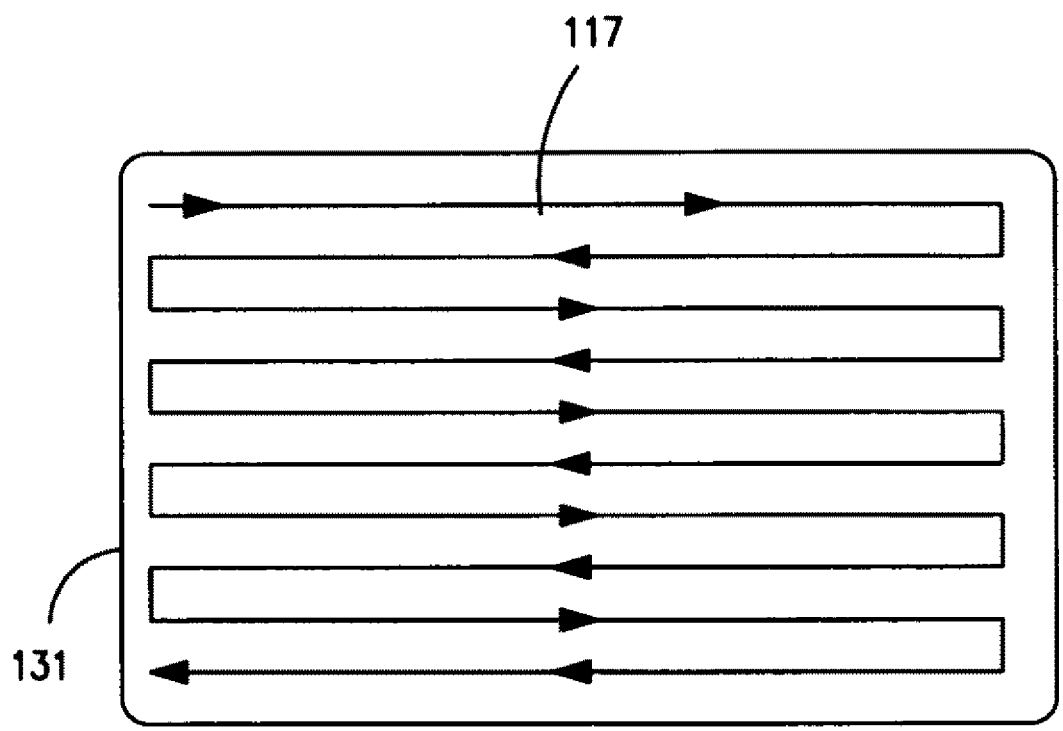
FIG. 12 of the drawings comprises a schematic representation of a sample injector path across the entirety of the mold member, such that the injector dispenses fiber bundles throughout the mold member.

The injector is moved to a new position within the mold member and the process is repeated. Sequentially, the injector traverses the mold until all of the desired fibers have been placed. An exemplary injector traversing 117 pattern is shown in FIG. 12. Of course, there is no particular pattern that must be followed, and it is contemplated that any number of different patterns are contemplated.

It will be understood that inasmuch as the cavity has a certain depth, the injector may repeatedly traverse the entire mold member to build up the thickness of the fibers within the mold. It will also be understood that as the thickness is built, the fibers that are at any given location within the mold may vary relative to depth (i.e., the z direction). For example, in the embodiment shown, recycled fibers may be used throughout the mold member to form a base upon which the other fibers are placed. Thus, through any portion of the mold cavity, the strata may comprise layers of same or different fiber types. In other embodiment, the entire thickness of a particular region of the mold may be formed from a homogenous fiber composition.

Once the injector has deposited the desired fiber bundles in the desired orientations, the mold member is closed. In particular, and with reference to FIG. 6, the top surface 75 of the mold member 24 is placed over the fibers and secured to the side surfaces so as to define the mold cavity. Typically, the cavity includes an excess quantity of fibers such that placement of the top surface of the mold member compresses the fibers placed within the mold cavity.

Figure 14:
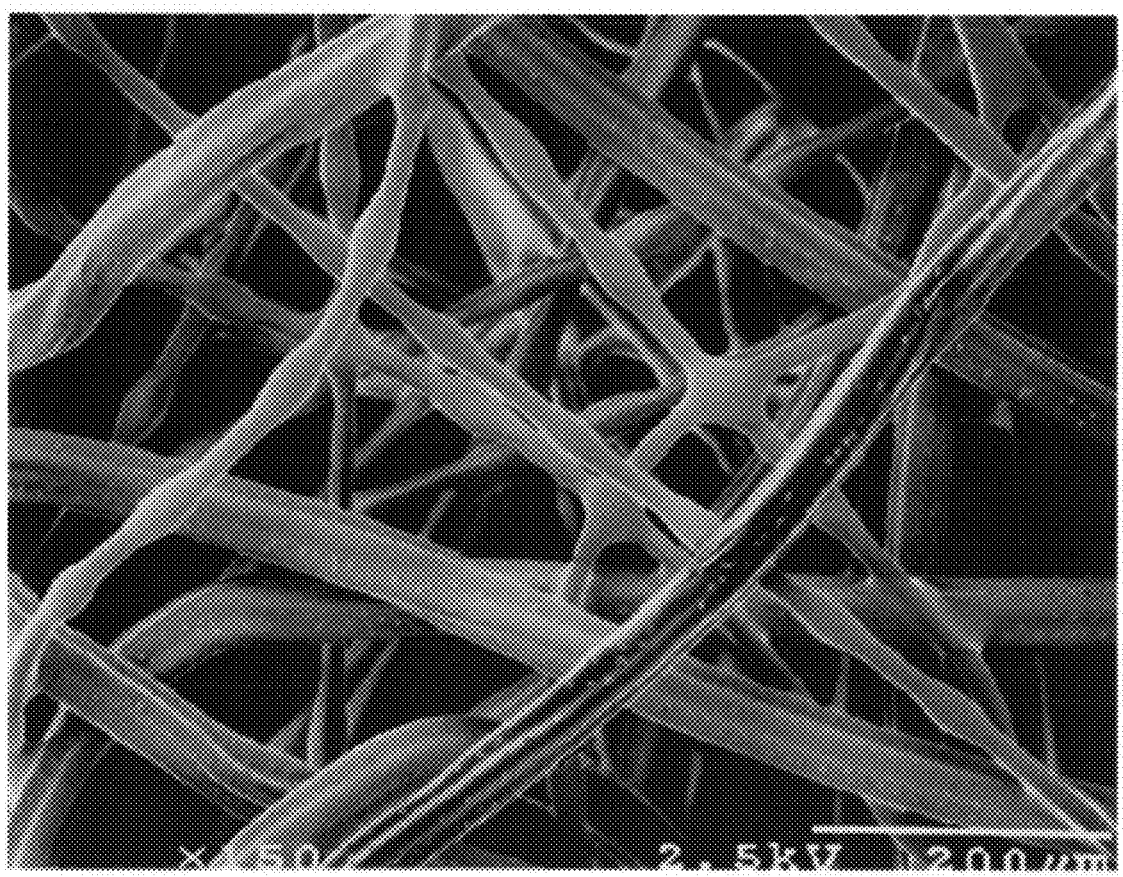
FIG. 14 of the drawings comprises a microscopic enlargements of a completed and formed article.

The formed mold member is then inserted into the heat assembly 28 of FIG. 4. In particular, heated air is directed through the permeable top and bottom mold surfaces. The heated air elevates the temperature of the fibers beyond the melting temperature thereof, and melts the bonding fibers. The melted bonding fibers then spread and coat or couple to other fibers thereby bonding the fibers to each other. An exemplary microscopic enlargement showing the attachment and the interaction between fibers is shown in FIG. 14.

In turn, a substantially unitary member is formed from the plurality of fibers. In the embodiment shown, the mold member is placed within the heat assembly for a period of approximately one to three minutes within an environment of approximately 110° C. and 200° C. where the medium comprise heated air. Where the medium comprises superheated steam, higher temperature are utilized, wherein less time is required bond the fibers. The times and temperatures are required to insure that the bonding fibers have properly propagated throughout the article and have bonded to the surrounding fibers as desired. These times and temperature parameters are largely determined by the fiber characteristics and article geometrical configuration, as well as the medium or fluid that is utilized to heat the fibers to form the article. Again, these times and temperatures are set forth for exemplary purposes and are not to be deemed as limiting the invention in any respect.

Figure 13:
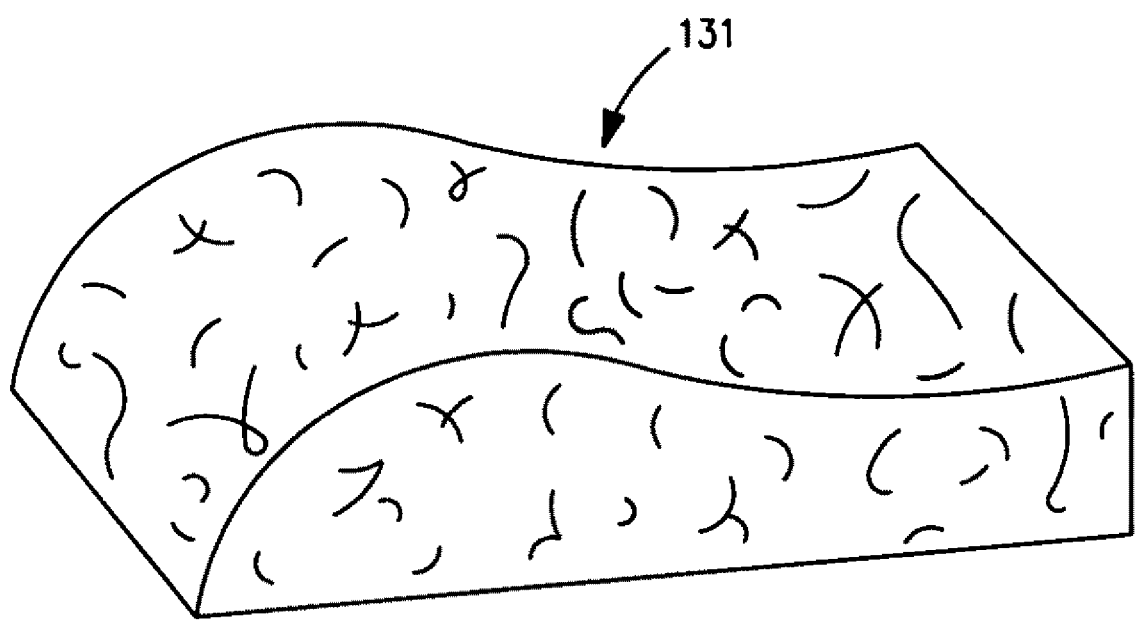
FIG. 13 of the drawings comprises a schematic representation of an article formed by the system of the present disclosure, wherein the article comprises a seat bottom.

Once the mold member and the resulting article have been in the heat assembly for the desired period of time, they are removed from the heat assembly and positioned in the cooling assembly (FIG. 5). The cooling assembly controllably reduces the temperature of the mold member and the article to room temperature. Significantly, and optionally, when placed within the cooling assembly, the mold member can be manipulated so as to compress the article therewithin, while the article is above the glass transition temperature of certain ones of the fibers. This can be achieved through the movement and reattachment of the top surface of the mold member. Inasmuch as the article will be at a temperature beyond the glass transition temperature of certain ones of the fibers, the compression of the mold member and the article during cooling thereby conditioning the fibers of the resulting article. Such a compression may, for example reduce the volume of the cavity 10% to 40% (while it could be either greater or lesser). During the compression (or at other times in the cooling procedure), the temperature within the cooling cavity can be maintained at a certain predetermined temperature for a period of time, prior to continuing the cooling and the reduction in temperature. At some point in the process the continued cooling is undertaken until the article is cooled to a desired low temperature. With reference to FIG. 13, at such time it can be removed from within the mold to render article 131. It will be understood that the article can be covered with a cover such as a fabric or other textile which may be slip covered or which may be adhered to portions of the article 131.

Figure 16:
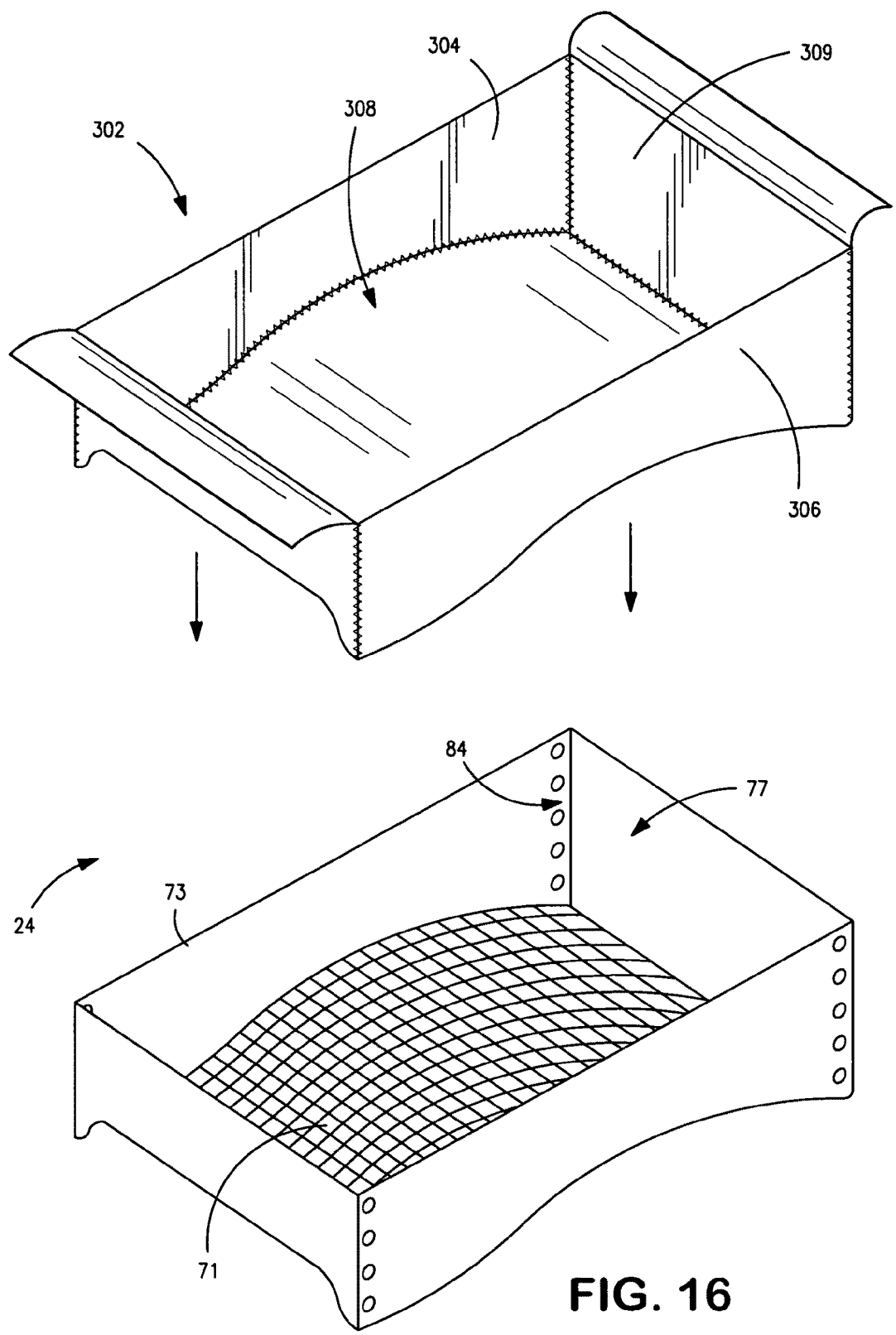
FIG. 16 of the drawings comprise an exploded perspective view of another embodiment of a mold member wherein a fabric or textile is introduced during article formation within the mold member.

In another embodiment as is shown in FIG. 16, the cover (typically, a synthetic or natural textile or fabric) can be assembled at the same time as the article is formed. In particular, a cover member 302 includes an inside surface 304 and an outside surface 306. The inside surface 304 forms cavity 308. In certain embodiments, an adhesive 309 can be printed, sprayed or otherwise applied to the inside surface of the cover so as to provide proper adhesion thereof to the article. The adhesive can be, for example, activated through any number of means, including heat and moisture. In other embodiments, the fibers that are utilized immediately proximate the fabric may be specially selected to bond to the inside surface of the cover when heated.

It will be understood that the cover includes passageways to allow for the heating medium or fluid to pass therethrough. For example, the textile or fabric material may comprise an fluid (i.e., air, steam, water) permeable member which allows for the passage of the fluid therethrough with little impedance. In other embodiments, the material of the cover member may be only partially permeable wherein a one or more outlets or passageways are provided through a portion of the cover to direct the fluid away from the article within the cavity 308. In certain embodiments a manifold structure may be provided within the article to direct the fluid out through such passageways.

In such an embodiment, the cover is inserted into the mold member. Subsequently, the fibers are injected into the mold member to fill the cavity 308 and the mold member. Once filled, the cover member can be positioned over the fibers to cover the same. Next, the heating and cooling steps are undertaken. The formed article, during the heating and cooling steps becomes bonded to the underlying article, and, in turn, the article is formed together with an integral cover member. In other embodiments, the cover can be introduced into the mold, prior to, during or after the injection process, depending on the particular placement and position of the cover.

Figure 18:
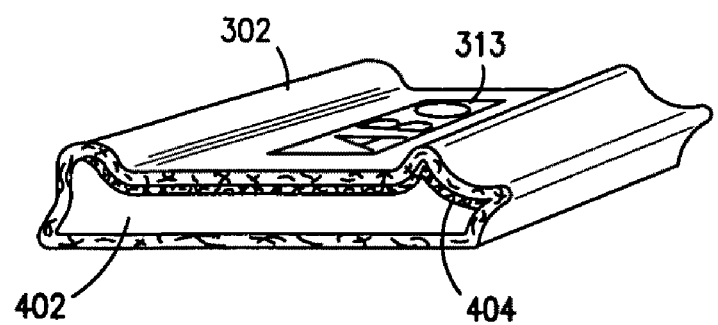
FIG. 18 of the drawings comprises a perspective view of an article having a frame member positioned therein which is expose on the side edge, and which includes a silkscreen or graphic thereon bearing the indicia "ABC" on a cover thereon.

It will be understood that in certain embodiments, only a portion of the article may include a fabric cover. In a similar manner, as is shown in FIG. 18, a silkscreen or graphic 313 may be applied to the cover as the article is formed within the mold member by inserting the silkscreen or graphic element into the mold member with the cover and the fibers prior to the heating and cooling of the fibers. In turn, the silkscreen or graphic will become attached to the resulting cover.

Figure 17:
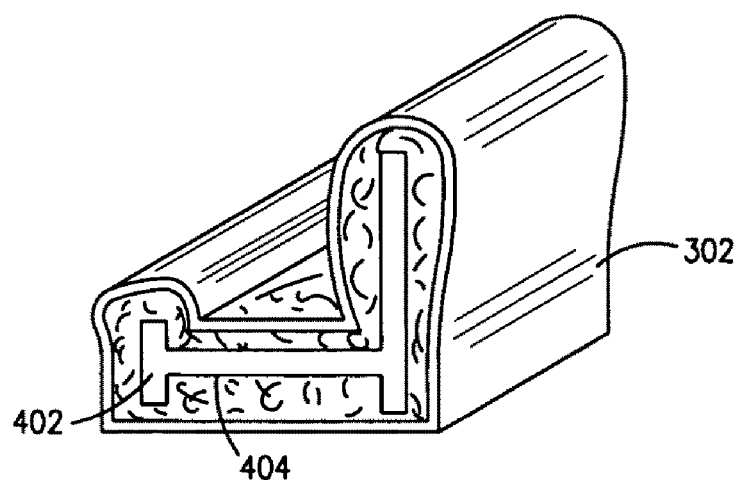
FIG. 17 of the drawings comprises a cross-sectional perspective view of an embodiment of the article which includes a frame member embedded therewithin, as well as a cover member integrally formed therewith.

In yet another embodiment, as is shown in FIGS. 17 and 18, a frame member 402 can be positioned within the article. The member 402 includes an outside surface 404 and is dimensioned so that it can fit within the mold member. The member 402 may comprise a metal, plastic, fiber-based, wood, or other natural or synthetic member which is compatible with the fibers. Typically, such a member comprises a substantially rigid, or a flexible material. In one embodiment, the rigid frame-like member 402 may comprise a chair frame, wherein the chair cushions can be formed around the frame within the mold member.

Specifically, to form such an article, fibers are introduced into the mold member. It will be understood that a cover (e.g., fabric or textile, etc.) can be introduced into the mold member prior to the introduction of fibers so that the cover member can be formed onto the article during the formation thereof. Once a quantity of fibers are introduced into the mold member, the frame is positioned with the mold member in the proper orientation.

Next, the fibers are again directed into the mold member so as to eventually surround at least a portion of the outside surface 404 of the member 402. An adhesive can be applied to the outside surface 404 to assist with adhesion of the fibers to the member 402. Once the member 402, the fibers and optionally the cover member is properly positioned within the mold member, the mold member is directed through the heating and cooling processes to form the article. In certain embodiments, the entirety of the frame member is covered by fibers (FIG. 17), whereas in other embodiments portions of the frame member can remain exposed (FIG. 18).

It is contemplated that the article, in such an embodiment, may comprise a chair, loveseat, couch or other larger cushioned object. Of course, the invention is not limited thereto, and it is contemplated that smaller articles having an integrated frame can be formed.

Advantageously, the article can be custom formed from a plurality of different materials and fiber types. The combination of fiber types and fiber bundle constituents is limitless. Thus, a custom formed article, utilizing cost effective materials where possible, and high performance materials where required can be rendered. Furthermore, the transition from one fiber type to another fiber type can be done gradually by through variable mixing of the different fiber types. Additionally, any number of different articles having varying geometries, with or without textile or fabric covers and with or without embedded frame members can be created on the same equipment, substituting only a different mold member.

Additionally, the article comprises a plurality of fiber members that are bonded through the melting of certain ones of the fiber members. There are essentially no closed cells in the material, and the fibers are substantially non-porous. As such, the material wicks moisture, pulling it away from the surface and along the fibers. Furthermore, the material allows for the passage of air therethrough, so that it can be easily ventilated for active heating or cooling. Furthermore, fluids are not retained within the material and, to the extent that fluids do not pass through the material, they quickly evaporate. They are not absorbed. Thus, the article can be easily washed and dried. Furthermore, the article is not susceptible to rotting, retaining odors or facilitating mold and mildew growth. Thus, the articles are well suited for use in potentially wet, damp and odiferous applications.

Amongst other uses, the articles can be used as the foundation for chairs, beds and other structures for infants and children. Additionally, articles can be used for pet bed applications. Again, these uses are set forth as exemplary and not intended to be limiting.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A method of forming an article from a plurality of fiber bundles comprising the steps of:
    providing a first supply of fiber bundles and a second supply of fiber bundles, wherein the first supply of fiber bundles and the second supply of fiber bundles each include bonding fibers and each comprise different fiber compositions;
    determining a feed rate for the first supply of fiber bundles to an injector assembly and determining a feed rate for the second supply of fiber bundles to an injector assembly, with the first supply of fiber bundles meeting the second supply of fiber bundles at the injector assembly for mixing therein;
    sequentially injecting fiber bundles from the injector assembly to predetermined positions within a mold member;
    altering the feed rate for at least one of the first supply of fiber bundles and the second supply of fiber bundles as fed to the injector assembly
    heating the fiber bundles within the mold member to facilitate the adhesion of bonding fibers to, in turn, integrate the fiber bundles into an article; and
    removing the fiber bundles from the mold member.

2. The method of claim 1 wherein the step of providing a first supply of fiber bundles comprises the steps of:

providing a fiber tow comprising a bonding fiber and at least one other fiber; and separating the fiber tow into fiber bundles.

3. The method of claim 2 wherein the step of providing a fiber tow further comprises the steps of:

providing at least a bonding fiber and at least one other fiber in a predetermined ratio;

mixing the provided fibers together; and forming a fiber tow.

4. The method of claim 3 wherein the at least one other fiber further comprises at least one of a performance fiber, a feel fiber and a recycled fiber.

5. The method of claim 3 wherein the at least one fiber further comprises at least two other fibers provided in predetermined ratios.

6. The method of claim 1 wherein the step of altering comprises the step of feeding each of the first supply of fiber bundles and the second supply of fiber bundles to the injector simultaneously in a plurality of different feed rates.

7. The method of claim 1 wherein the mold member comprises a permeable member, the step of heating further comprising the step of:

directing an air flow at an elevated temperature through the mold member for a period of time.

8. The method of claim 7 wherein the step of directing an air flow further comprises the steps of:

placing the mold member within an oven; and recirculating an air flow through the mold member for a period of time.

9. The method of claim 1 wherein the mold member comprises a permeable member, the step of heating further comprising the step of:

directing superheated steam at an elevated temperature and pressure through the mold member for a period of time.

10. The method of claim 1 further comprising the step of inserting a cover member within the mold member one of prior to, during and after the step of sequential injection of the fiber bundles within the mold member.

11. The method of claim 10 further comprising the step of applying an adhesive to an inside surface of the cover member one of prior to or after the step of insertion.

12. The method of claim 1 further comprising the step of inserting at least one of a silkscreen and a graphic within the mold member one of prior to, during and after the step of sequential injection of the fiber bundles within the mold member.

13. The method of claim 1 further comprising the step of inserting a frame member within the mold member one of prior to or during the step of sequential injection of the fiber bundles within the mold member.

14. The method of claim 13 further comprising the step of applying an adhesive to the frame member.

15. The method of claim 1 further comprising the step of cooling the integrated fiber bundle after the step of heating.

16. The method of claim 15 further comprising the step of conditioning the integrated fiber bundle during the step of cooling.

* * * * *